United States Patent [19]
Young

[11] Patent Number: 6,029,539
[45] Date of Patent: Feb. 29, 2000

[54] TWIN MASS FLYWHEEL

[75] Inventor: Alastair John Young, Kenilworth, United Kingdom

[73] Assignee: Automotive Products, PLC, Leamington Spa, United Kingdom

[21] Appl. No.: 09/125,340

[22] PCT Filed: Feb. 10, 1997

[86] PCT No.: PCT/GB97/00361

§ 371 Date: Aug. 14, 1998

§ 102(e) Date: Aug. 14, 1998

[87] PCT Pub. No.: WO97/30298

PCT Pub. Date: Aug. 21, 1997

[30]     Foreign Application Priority Data

Feb. 10, 1996 [GB] United Kingdom ............... 9603268

[51] Int. Cl.$^7$ ............................. F16F 15/10; G05G 1/00
[52] U.S. Cl. ................................. 74/574; 74/572
[58] Field of Search ........................ 74/572, 574

[56]         References Cited

U.S. PATENT DOCUMENTS

| | | | |
|---|---|---|---|
| 3,296,887 | 1/1967 | Larsen ......................................... | 74/574 |
| 3,477,311 | 11/1969 | McGreary ................................. | 74/574 |
| 4,317,435 | 3/1982 | Kohlhage ............................... | 74/572 X |
| 4,325,472 | 4/1982 | Steeg et al. ............................ | 74/572 X |
| 4,635,776 | 1/1987 | Billet et al. ............................ | 74/572 X |
| 4,714,449 | 12/1987 | Woerner et al. ....................... | 74/574 X |

FOREIGN PATENT DOCUMENTS

| | | |
|---|---|---|
| 18 12 067 | 5/1960 | Germany . |
| 995976 | 6/1965 | United Kingdom . |
| 2171172 | 8/1986 | United Kingdom . |
| 89 01097 | 2/1989 | WIPO . |
| 96 06289 | 2/1996 | WIPO . |

*Primary Examiner*—Tamara L. Graysay
*Assistant Examiner*—Brandon C Stallman
*Attorney, Agent, or Firm*—Paul E Milliken; Ray L Weber; Lee A Germain

[57]          ABSTRACT

A twin flywheel (210) comprising first (211) and second (212) co-axially arranged flywheel masses which are mounted for limited angular rotation relative to each other. The flywheel masses (211, 212) are interconnected by at least one linkage arrangement (240), comprising a multi-link linkage (240) having two or more circumferentially spaced main links (242, 251) pivotally mounted on the second flywheel masses with the or each circumferentially adjacent pair of main links interconnect via a generally circumferentially extending connecting linkage, and an anchor link (242) which connects the multi-linkage (240) with the first flywheel mass. Relative rotation of the flywheel masses (211, 212) causes the multi-link linkage (240) to be pivoted relative to the second flywheel mass by the anchor link, so that when the twin mass flywheel is rotating, relative rotation of the flywheel masses (211, 212) is resisted by centripetal forces acting on the linkage arrangement. Any particular links may be in the form of a unitary link or in the form of a pair parallel plates. Associated with one or more links, or pivots or acting between the flywheel masses (211, 212) there may be controlling means to control the relative rotation of the flywheel masses (211, 212).

22 Claims, 9 Drawing Sheets

TWIN MASS FLYWHEEL

The present invention relates to a twin mass flywheel for transmitting torque and absorbing or compensating for torsional vibrations such as can arise in a vehicle transmission assembly and in particular in a commercial vehicle transmission assembly.

Link type twin mass flywheels are known for example from UK patent GB2229793 in which two co-axial flywheels are rotatable relative to each other to a limited extent, with a plurality of pivotal linkages interconnecting the two flywheel masses to resist relative rotation.

It is the object of the present invention to provide a link type twin mass flywheel with an improved linkage which torsionally stiffens the twin mass flywheel at relatively lower rotational speeds.

Thus according to the present invention there is provided a a twin mass flywheel comprising first and second co-axially arranged flywheel masses which are mounted for limited angular rotation relative to each other, the flywheel masses being interconnected by at least one linkage arrangement the or each linkage arrangement comprising multi-link linkage having two or more circumferentially spaced main links pivotally mounted on one of the flywheel masses with the or each circumferentially adjacent pair of main links interconnect via a generally circumferentially extending connecting linkage, and an anchor link which connects the multi-link linkage with the other flywheel mass, relative rotation of the flywheel masses causing the multi-link linkage to be pivotted relative to said one flywheel mass by the anchor link, so that when the twin mass flywheel is rotating, relative rotation of the flywheel masses is resisted by centripetal forces acting on the linkage arrangement.

The twin mass flywheel may have two or more linkage arrangements which are disposed at circumferentially spaced locations around the twin mass flywheel.

The twin mass flywheel may have at least one main link or connecting link, or anchor link which is in the form of a pair of axially spaced plates.

The invention shall now be described by way of example only with reference to the accompanying drawings in which:

FIG. 6 is a diagrammatic representation of the twin mass flywheel of FIG. 1, and FIGS. 7 to 12 are further diagrammatic representations of further embodiments of the present invention with first, second, third and fourth pivots being labelled from 100 to 600 greater than corresponding pivots 1, 2, 3, 4 of FIG. 6.

Figure 1:
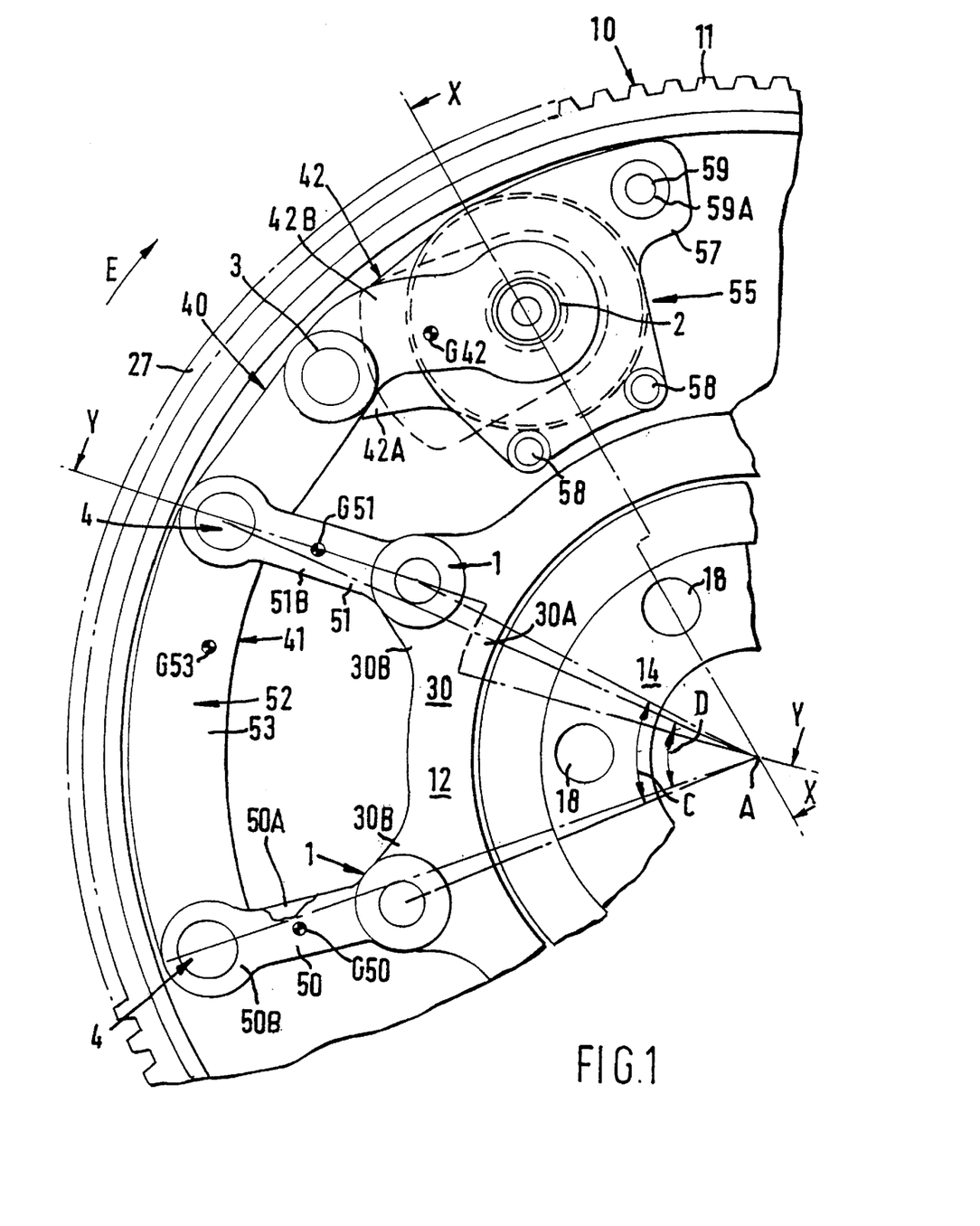
FIG. 1 is a partial axial cut-away view of a twin mass flywheel according to the present invention taken along the line BB of FIG. 2 showing the linkage arrangement 40 in its centrifugally neutral position.
Figure 2:
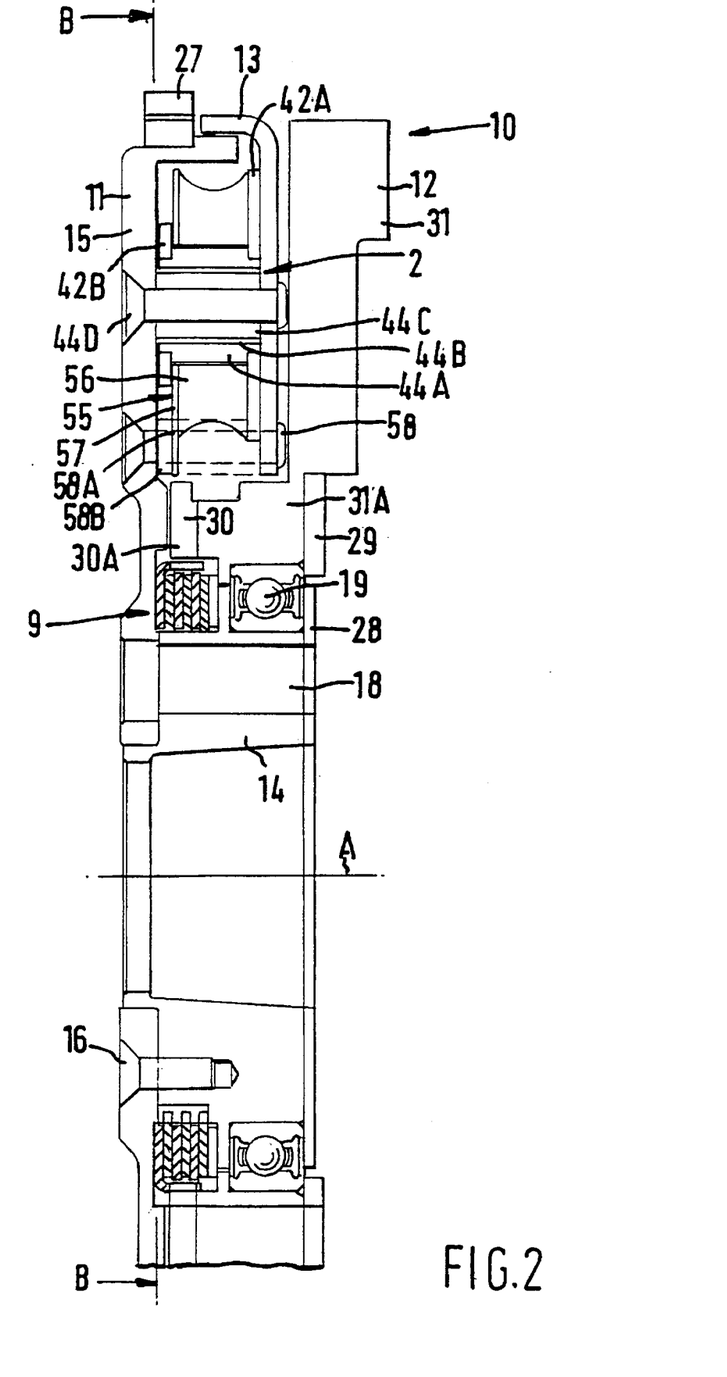
FIG. 2 is a radial cross-section taken along the line XX of FIG. 1.
Figure 3:
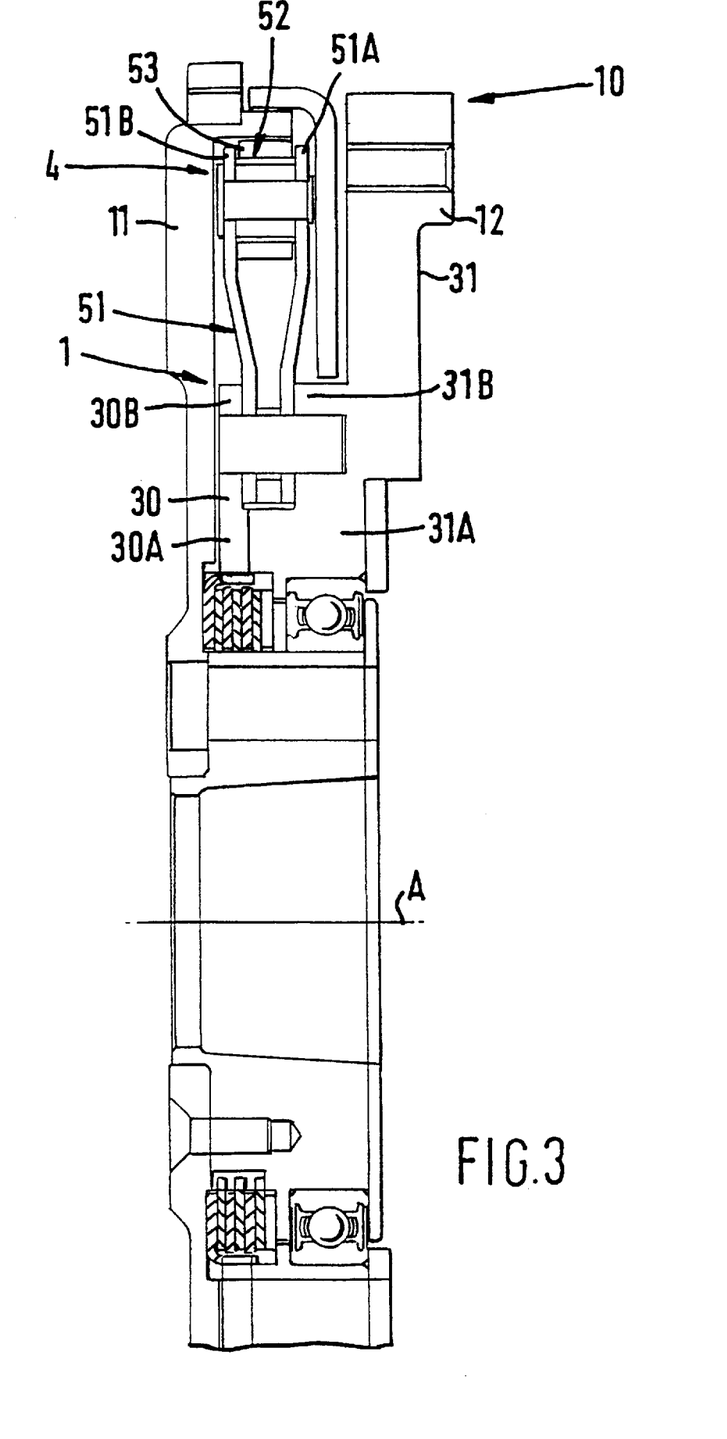
FIG. 3 is a radial-cross section taken along the line YY of FIG. 1.

With reference to FIGS. 1 to 3 there is illustrated a twin mass flywheel 10 which is formed from two flywheel masses 11 and 12.

One flywheel mass 11 (also known as an input flywheel mass) is fixed to a crankshaft (not shown) of an internal combustion engine by way of a central hub 14 and bolts (not shown) which pass through holes 18. In use a friction clutch (not shown) is secured to the second flywheel mass 12 (also known as an output flywheel mass) to connect the second flywheel mass with an associated gearbox (not shown).

Under normal drive and over-run conditions the twin mass flywheel 10 rotates in an clockwise direction in the view shown in FIG. 1 as indicated by arrow E about axis A.

The flywheel mass 11 comprises the central hub 14, a main housing plate 15, a cover plate 13 and a starter ring 27 which is welded to the main housing plate 15. An inner bearing retaining plate 28 is fixed to the hub 14 by rivets (not shown) to retain a bearing 19 on which second flywheel mass 12 is mounted. Housing plate 15 is fixed to central hub 14 by screws 16.

The second flywheel mass 12 comprises a flywheel plate 31 with an outer bearing retaining plate 29 and a pivot plate 30 both fixed to the flywheel plate 31 by bolts (not shown).

Friction damper 9 assists in controlling relative rotation of the flywheel masses 11 and 12 and consists of a pack of interleaved friction discs which are alternatively splined rotationally fast with flywheel mass 11 and flywheel mass 12 respectively and which are axially biased into frictional contact by a belleville spring.

Flywheel plate 31 has an annular inner portion 31A with plurality of lugs 31D which form part of first pivots 1.

Pivot plate 30 has an annular inner portion 30A with a plurality of lugs 30B which align with lugs 31B and also form part of first pivots 1.

Relative rotation between two flywheel masses 11 and 12 is primarily controlled by a plurality of linkage arrangements 40 (only one shown) spaced circumferentially around the flywheel 10.

Each linkage arrangement 40 comprises a multi-link linkage 41 carried on the flywheel mass 12 and an anchor link 42 (in the form of a axially spaced pair of plates 42A and 42B) pivotally mounted on the flywheel mass 11 by way of a second pivot 2. The multi-link linkage 41 and the anchor link 42 are pivotally connected to each other by means of a third pivot 3.

The multi-link linkage 41 consists of two main links 50 and 51 (each in the form of a pair of axially spaced arms 50A, 50B and 51A, 51B respectively) pivotally connected at their radially inner ends to circumferentially spaced locations on the flywheel mass 12 via pivots 1 and a connecting linkage 52 (in the form of a connecting link 53). The radially outer ends of links 50 and 51 are pivotally connected to circumferentially spaced locations on the connecting linkage 52 via fourth pivots 4.

Second pivot 2 comprises a shouldered tube 44A which has a friction reducing bush 44B press fitted into its internal diameter. The anchor link plates 42A and 42B each have a hole which is press fitted onto an outer diameter of respective ends of the tube 44A. The second pivot 2 further comprises a hollow pin 44C which is held rotationally fast between the housing plate 15 and cover plate 13 by rivet 44D with the shouldered tube 44A and bush 44B being able to rotate about the hollow pin 44C.

Additionally associated with second pivot 2 there is a controlling means 55 which controls the rotation of the anchor link 42 (and in particular anchor link plate 42A) relative to the housing plate 15 and cover plate 13. This controlling means is in the form of a disc of elastomeric material 56 which is bonded on one axial side to the anchor link plate 42A and is bonded on the other axial side to a plate 57. Both plate 57 and the disc of elastomeric material 56 have a central hole which is a clearance fit on the outside diameter of the shouldered tube 44A. Plate 57 is fixed rotationally fast to housing plates 15 and cover plate 13 by rivets 58 passing through holes 58A and spacers 58B, and is additionally held rotationally fast within housing plate 15 via rivet 59 passing through hole 59A. Any rotation of anchor link plate 42A relative to housing plate 15 causes the elastomeric material to be wound up in torsion. Anchor link plate 42B moves in unison with anchor link plate 42A and ensures pivots 2 and 3 are loaded evenly.

It will be noted from FIG. 1 that the first pivot 1 is positioned radially inwardly of the second, third and fourth pivots 2, 3 and 4.

Under no-load conditions with the clutch disengaged, centrifugal force acts on each linkage arrangement 40 and particularly on each connecting link 53 and urge the links in a radially outward direction with fourth pivots 4 adopting a position substantially radially outboard of repective first pivots 1 as shown in FIG. 1 (this position is regarded as the centrifugal neutral position between the drive and over-run directions of relative rotation of the flywheel masses). At higher rotational speeds the centrifugal force is greater and whilst this does not affect the configuration under no-load conditions it greatly affects the force required to move the flywheel mass 12 relative to the flywheel mass 11 i.e. the flywheel torsional stiffness increases with rotational speed of the twin mass flywheel.

If the clutch is engaged and power is transmitted in the drive direction from flywheel mass 11 to flywheel mass 12 there is a tendency for the two masses to rotate relative to each other (flywheel mass 11 rotates clockwise relative to flywheel mass 12 when viewing FIG. 1) with each multi-link linkage 41 pivoting relative to flywheel mass 12 due to the connection, via associated anchor link 42 with flywheel mass 11. At relatively low speeds when the influence of centrifugal force is smaller the flywheel masses move readily relative to each other i.e. the flywheel torsional stiffness is relatively low. However at relatively high speeds the influence of centrifugal force is much greater and relative rotation of the flywheel masses requires greater force i.e. the flywheel torsional stiffness is relatively high. Thus the flywheel torsional stiffness is speed sensitive.

If the clutch is engaged and power is transmitted in the over-run direction from flywheel mass 12 to flywheel mass 11 the effects are similar to the above except that the direction of relative rotation is reversed (flywheel mass 11 rotates anticlockwise relative to flywheel mass 12 when viewing FIG. 1) and in the embodiment shown in FIG. 1 the multi-link linkages 41 pivots in the opposite direction relative to flywheel mass 12.

It will be noted that with sufficient relative rotation of the flywheel masses in either direction the third and fourth pivots 3 and 4 will move radially inwards, but no radial movement of the first and second pivot 1 and 2 occurs, thus for every 1 mm of radially inward movement of third pivot 3 the centre of gravity G42 of the anchor link 42 moves radially inwards by less than 1 mm (in the embodiment shown in FIG. 1 the centre of gravity G42 would move radially inwards by about half the radial movement of pivot 45 since it is approximately mid-way between the second and third pivots 2 and 3).

Similarly the centre of gravity G50,G51 of main links 50 and 51 always moves radially less than the radial movement of their respective fourth pivots 4.

However since no part of the connecting linkage 52 (i.e. connecting link 53) is radially fixed the potential to radially move its centre of gravity G53 is greater i.e. if both fourth pivots 4 move radially inwards by 1 mm then the centre of gravity G53 of the connecting link 53 also moves radially in by 1 mm.

At relatively low rotational speeds of a link type twin mass flywheel according to the present invention the ability to withstand relatively higher torques is improved i.e. the torsional stiffness is increased if, per degree of relative rotation of the twin mass flywheels, the overall centre of gravity of the or each linkage arrangement 40 is made to move radially inwards by a greater amount.

By arranging the two flywheel masses to be connected by a linkage arrangement according to the present invention the above mentioned improvement can be achieved over the prior art, further improvements can be achieved by making the connecting link 53 as a solid piece in the form of a bob weight.

It should be noted that in the centrifugally neutral position as shown in FIG. 1, the angle C subtended at the axis A of the twin mass flywheel 10 between adjacent first pivots 1 is greater than the corresponding angle D subtended between adjacent fourth pivots 4. Depending upon a particular installation the ratio of angles C to D can be varied and in particular angle C can be equal to angle D or angle C can be less than angle D (see FIG. 4 angles C1 and D1). Varying the ratio of angles C to D has a significant effect on the position and attitude of the link 53 when the flywheel masses are at the limits of their relative rotational positions. In this position if the ratio C:D is not unity one pivot 4 will be radially further in than the other pivot 4. For a particular installation, depending upon adjacent components in the twin mass flywheel, the ratio C:D can be adjusted so that both pivots 4 are at a minimum radius at the limits of relative rotation and thus the centre of gravity of all the links are also at a minimum radius and this improves the ability of the twin mass flywheel to withstand relatively high torques at relatively low speeds.

In addition to the controlling influence of the linkage arrangement 40, when the flywheel masses 11,12 rotate relative to each other the anchor link plate 42A rotates relative to the plate 57 causing the elastomeric material 56 to deform (as previously described). The elastomeric material 56 is thus a resilient type of controlling means which has a controlling influence on the relative rotation of the two flywheel masses.

Figure 4:
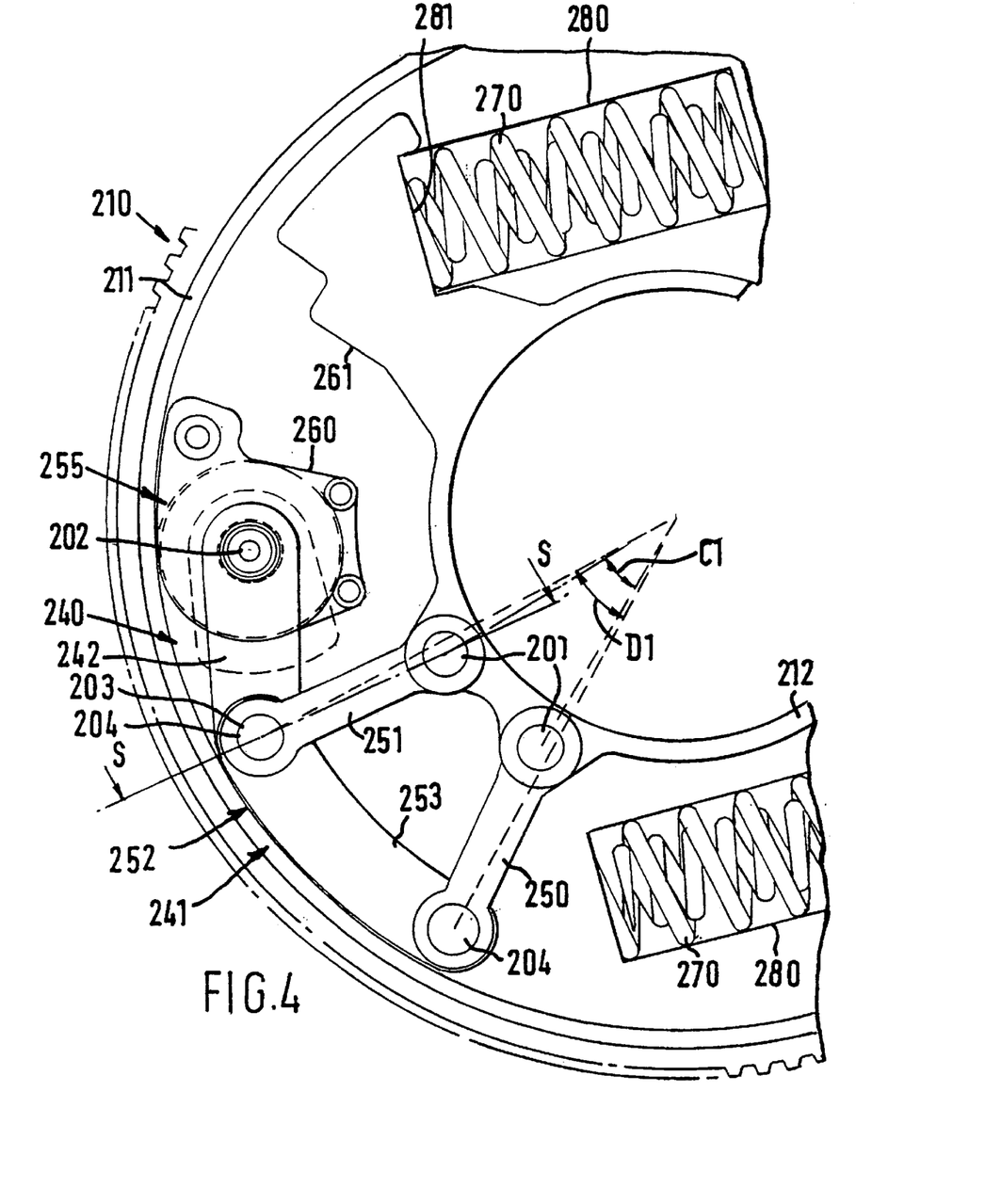
FIG. 4 is a section view of a second embodiment of a twin mass flywheel according to the present invention taken along the line RR of FIG. 5 showing the linkage arrangement 240 in its centrifugally neutral position.
Figure 5:
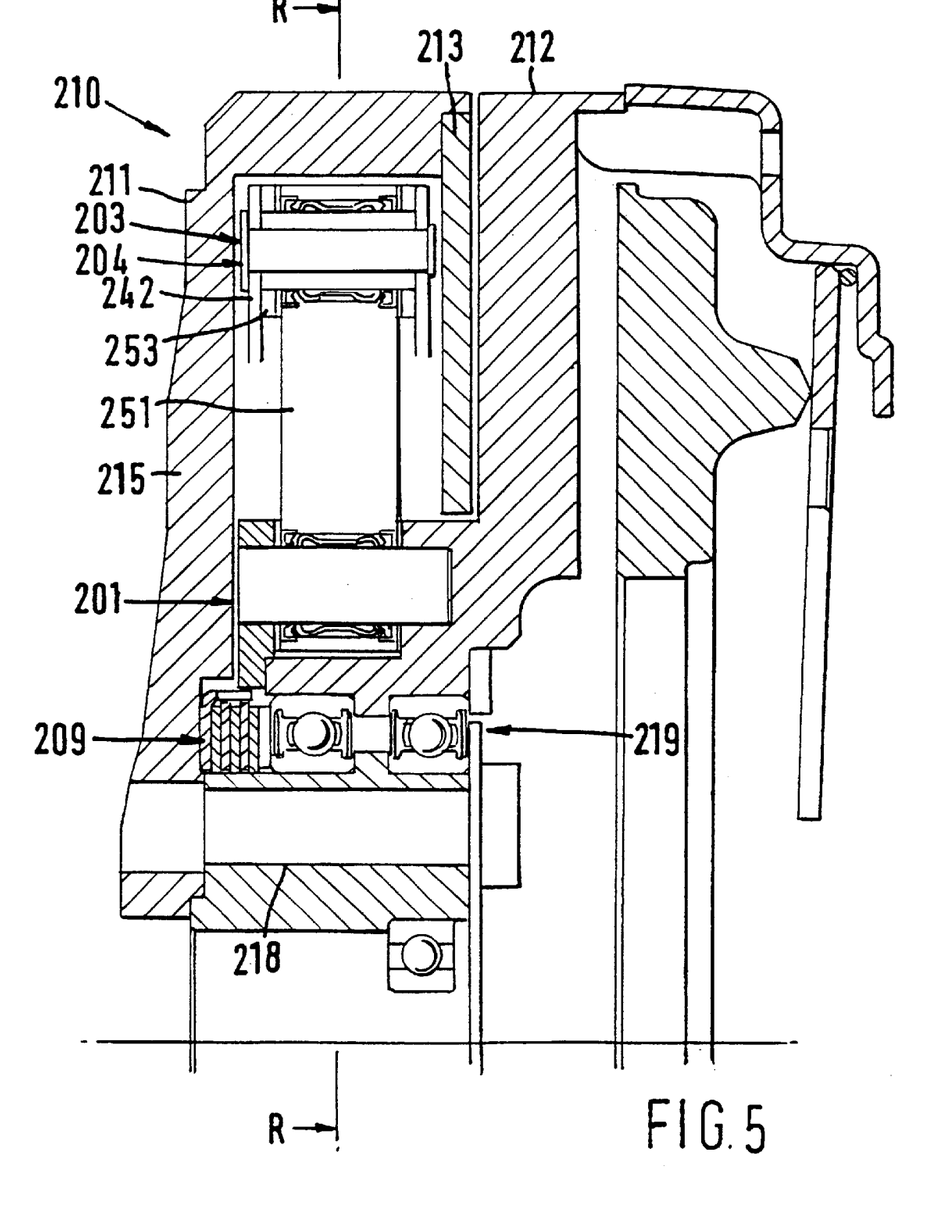
FIG. 5 is a radial cross section taken along the line SS of FIG. 4.

With reference to FIGS. 4 and 5 there is illustrated a second embodiment of a twin mass flywheel 210 with equivalent features labelled 200 greater than equivalent features in the twin mass flywheel 10 and the following should be noted:

(a) the bearing arrangement 219 consists of a pair of rolling element bearings;

b) pivots 201, 202, 203 and 204 include rolling element needle bearings;

c) each main link 250, 251 comprises a solid single link with a hole at each end to accommodate the needle bearings;

d) each connecting link 253 comprises a solid link with a fork at each end to accommodate a corresponding main link;

e) the anchor link 242 has a fork one end to accommodate the connecting link and main link, and a hole at the other end to accommodate a needle roller bearing and a pin which is fixed to the input flywheel;

f) the axis of the third pivot 203 (i.e. the pivot between the anchor link and connecting link) and the axis of one of the fourth pivots 204 (i.e. the pivot between the main link 251 adjacent the anchor link and the connecting link) are coincident;

g) abutments 260 on one flywheel mass contact corresponding abutments 261 on the other flywheel mass to limit the relative rotation of the flywheel masses in the drive and over-run direction. Similar abutments (not shown) limit relative rotation in the over-run direction.

h) the controlling influence of the linkage arrangment on the relative rotation of the flywheel masses is supplemented by controlling means in the form of assister springs 270 acting between the flywheel masses. In this case the springs 270 sit in aligned pockets 280 machined in main housing plate 215 and cover plate 213. Upon relative rotation of the flywheel masses an abutment 281 rotationally fast with the output flywheel 212 contacts one end of the spring 270 and compresses the spring.

Figure 6:
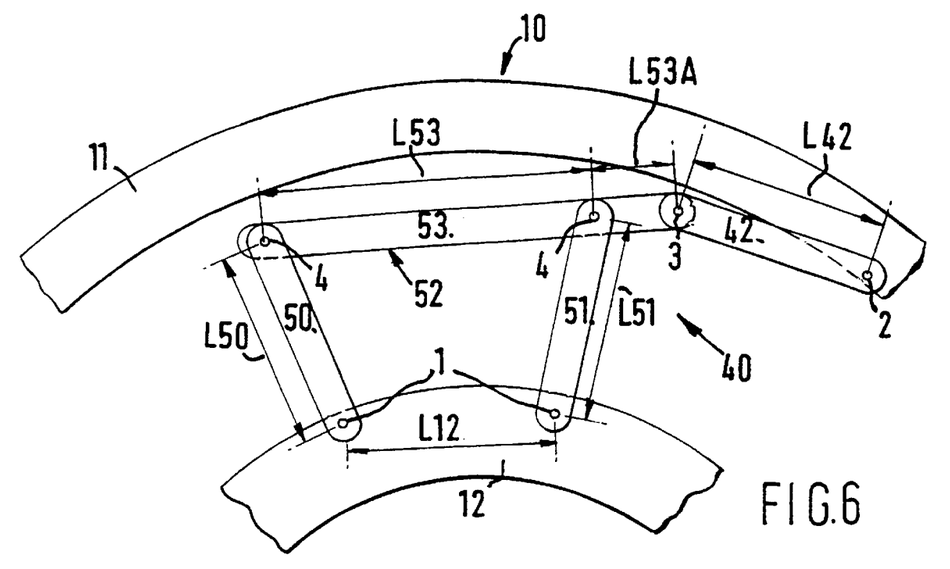

FIG. 6 shows a diagramatic representation of an embodiment of one of the linkage arrangements 40 of the twin mass flywheel 10 shown in FIG. 1. It is apparent that the connecting linkage 52 interconnecting main links 51 and 50 consists of part of link 53. The anchor link 42 connects with a further part of the connecting link 53.

Figure 7:
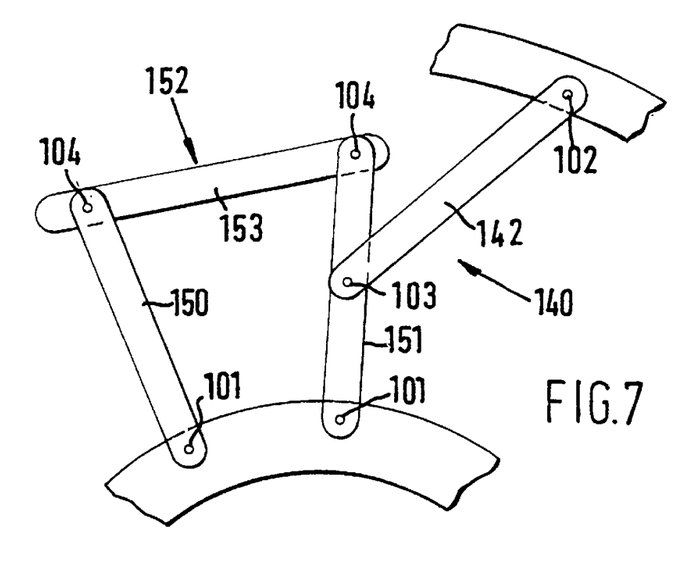

FIG. 7 shows a further diagrammatic representation of an embodiment of a linkage arrangement 140 in which the anchor link 142 is connected to a main link 151 and the connecting linkage 152 interconnecting main links 151 and 150 consists of a single connecting link 153.

Figure 8:
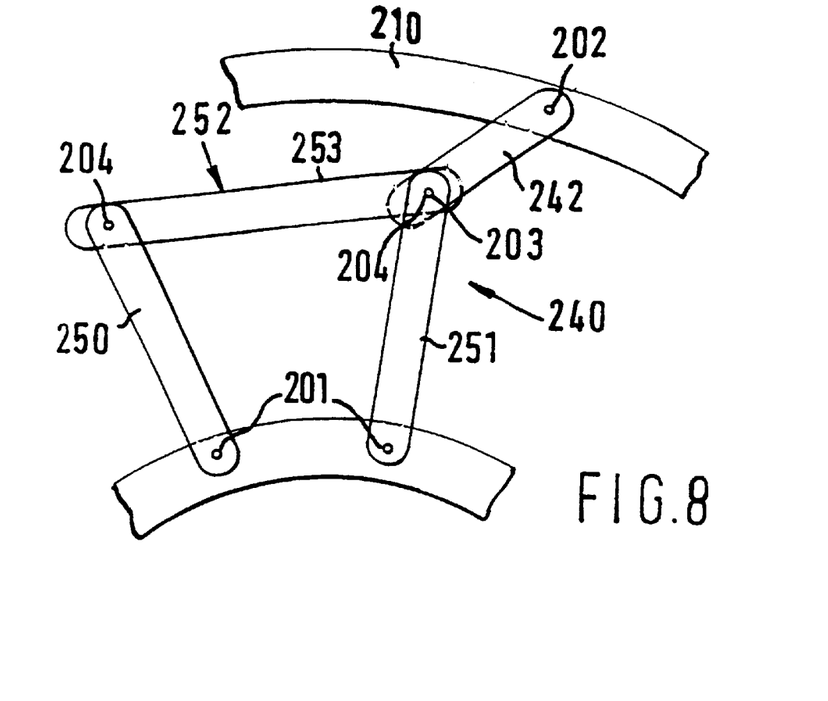

FIG. 8 shows a diagrammatic representation of an embodiment of one of the linkage arrangements 240 of the twin mass flywheel 210 shown in FIG. 4 in which the connecting linkage 252 interconnecting main links 251 and 250 consists of connecting link 253. The anchor link 242 is connected to the multi-link linkage by third pivot 203 which also acts as the pivotal connection of main link 251 to the connecting linkage and can therefore also be designated as a fourth pivot 204.

Figure 9:
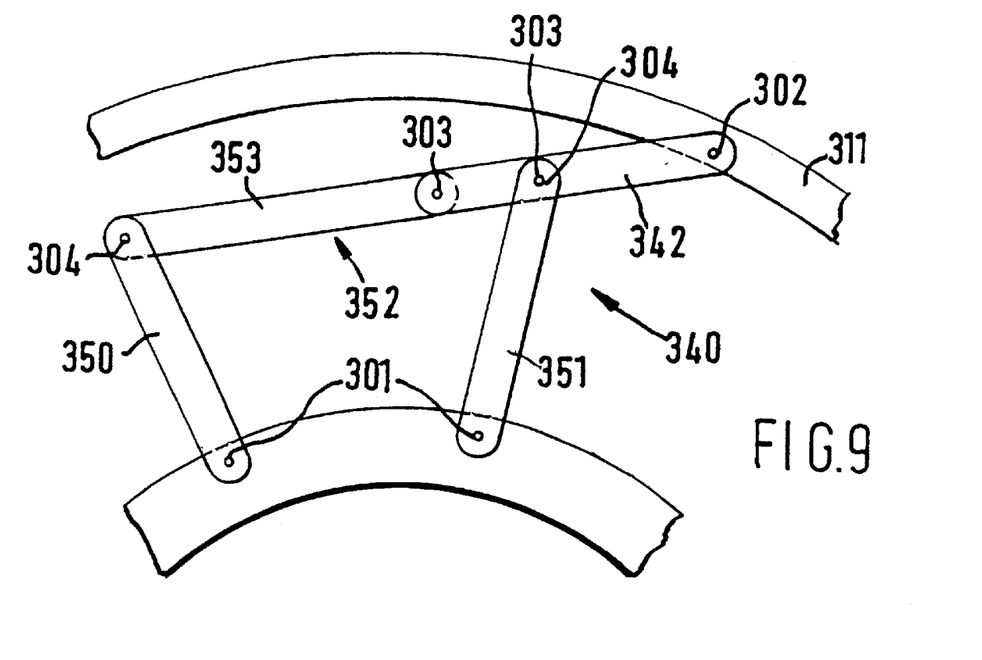

FIG. 9 shows a diagrammatic representation of an embodiment of a linkage arrangement 340 in which the connecting linkage 352 consists of a connecting link 353 and part of the anchor link 342. A further part of the anchor link 342 connects the main link 351 to flywheel mass 311. In this embodiment the anchor link is connected to the multi-link linkage by two third pivots 303 with one of the third pivots 303 also acting as the pivotal connection of the main link 351 to the connecting linkage 352 and can therefore also be designated as a fourth pivot 304.

Figure 10:
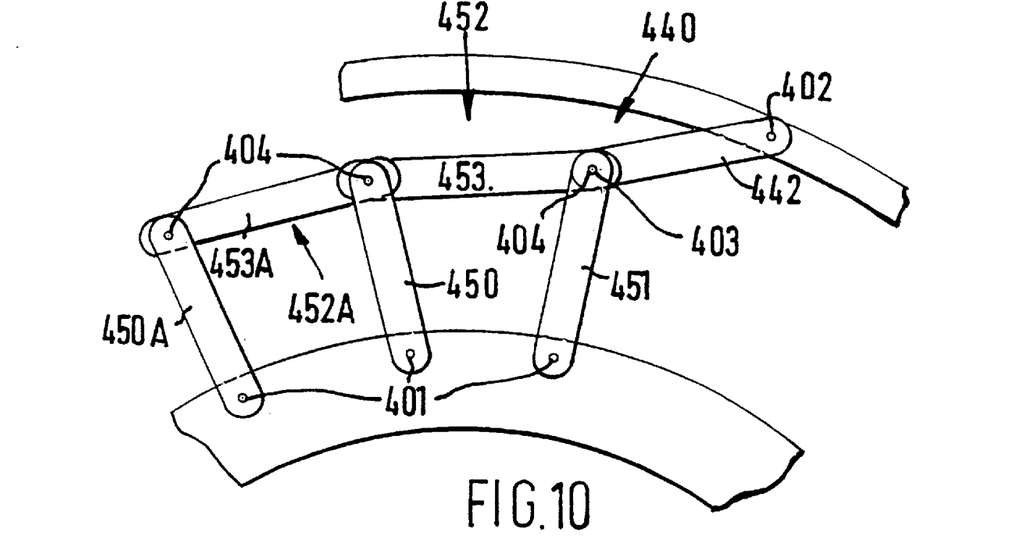

FIG. 10 shows a diagramatic representation of an embodiment of a linkage arrangement 440 with three main links 451, 450, 450A, two connecting linkages 452,452A and an anchor link 442.

Connecting linkages 452 interconnects main links 451 and 450 and consists of a single link 453. Connecting linkage 452A interconnects main links 450 and 450A and consists of a single link 453A. The anchor link 442 is connected to the pivotal connection of connecting link 453 and main link 451. One of the fourth pivots 404 is coincident with the third pivot 403 in a similar manner to FIG. 8.

Figure 11:
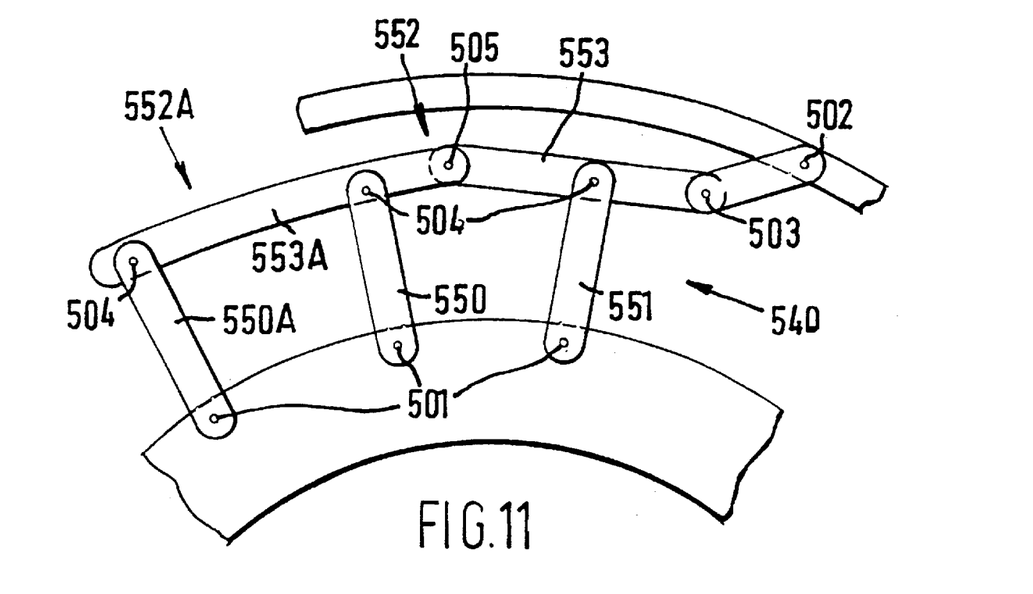

FIG. 11 shows a diagrammatic representation of an embodiment of a linkage arrangement 540 with three main links 551, 550, 550A and two connecting linkages 552, 552A. connecting linkage 552 interconnects main links 551 and 550 and consists of part of connecting link 553 and part of connecting link 553A. Links 553 and 553A are connected via a fifth pivot 505. Connecting linkage 552A interconnects main links 550 and 550A and consists of a further part of connecting link 553A. The anchor link 542 connects with a further part of connecting link 553.

Figure 12:
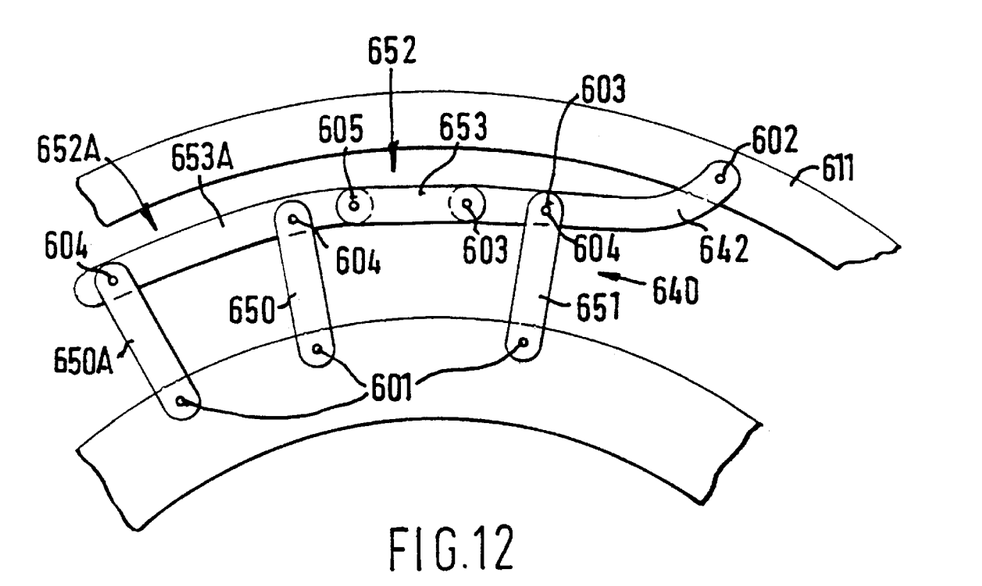

FIG. 12 shows a diagrammatic representation of an embodiment of a pivotal linkage arrangement 640 with three main links 651, 650, 650A and two connecting linkages 652, 652A.

Connecting linkage 652 interconnects main links 651 and 650 and consists of connecting link 653 and parts of anchor link 642 and part of connecting link 653A. Connecting links 653 and 653A are connected via a fifth pivot 605. Connecting linkage 652A interconnects main links 650 and 651 and consists of part of connecting link 653A.

In this embodiment the anchor link is connected to the multi-link linkage by two third pivots 603 with one of the third pivots 603 also acting as the pivotal connection of the main link 651 to the connecting linkage 652 and can therefore also be designated as a fourth pivot 604.

It should be noted that the term "single" used above in conjunction with link 153 (FIG. 7) 253 (FIG. 8) and 453, 453A (FIG. 10) describes the function of the link in relation to connecting adjacent main links i.e. there is only one link connecting the adjacent main links. This term "single" does not describe the construction of the link, thus any of the above mentioned single links could comprise, for example, a unitary link formed from one piece of material, or a pair of plates.

It will be noted that in all the embodiments shown, when the flywheel masses adopt any particular rotational position relative to each other, all the components of the linkage arrangement are in a predictable position.

The invention is not limited to the embodiments shown in the figures and the or each linkage arrangement of the twin mass flywheel can consist of any number of main links with an appropriate number of connecting links and an anchor link with appropriate pivotal connections such that the flywheels can rotate relative to each other and at any particular rotational position of the flywheels relative to each other the or each linkage arrangement is in a predictable position.

To tune a twin mass flywheel according to the present invention various parameters of the chosen linkage arrangment may be changed including the distance between pivots on one or more links, for example, the distance L50,L51 and L42 on links 50,51 and 42 respectively may be changed (see FIG. 6) or the distance L53 and L53A on link 53 may be varied.

Also when considering a particular pair of circumferentially spaced main links, the distance between the two pivotal connections of the main links with the flywheel mass i.e. the distance between the first pivots, may be varied, for example the distance L12 may be varied (see FIG. 6). In particular for a pair of circumferentially spaced main links the distance between adjacent first pivots need not be the same as the distance between adjacent fourth pivots for example L12 could be different from L53, and the distance between first and fourth pivots on one main link need not be the same as the distance between the first and fourth pivots on an adjacent main link for example the distance L51 could be different from L50.

Also with a linkage arrangement in its centrifugally neutral position not all the first pivots need to be at the same radius and not all the fourth pivots need to be at the same radius and the first and fourth pivots on a particular main link need not align with the axis of the twin mass flywheel (i.e. need not necessarily lie on a radius of the flywheel). For example, see main link 51 of FIG. 1 and note that first pivot 1 and fourth pivot 4 do not align with the axis A of the twin mass flywheel.

Furthermore associated with one or more of the main links, connecting links and/or anchor links there may be controlling means which control the relative rotation of the flywheel masses. For example, in the Applicants earlier British patent GB 2229793 FIG. 11 shows a spring 31 associated with link 28. A block of elastomeric material designed to be loaded in compression can be used to replace spring 31.

Alternatively, the metal spring type controlling means described in the Applicant's earlier pending British Patent Application No 95 10845.2 could be used in place of the elastomeric controlling means 55 of FIG. 1.

In a still alternative arrangement the elastomeric controlling means 55 of FIG. 1 could be replaced by a friction generating controlling means which comprises, for example, a pack of relatively rotatable interleaved friction discs which are alternatively splined or otherwise connected to flywheel mass 11 and anchor link 42 respectively and which are axially biased into frictional contact by a belleville spring or other bias means.

It is apparent that the abutments 260,261, and or drive assister springs and/or over-run assister springs 270 shown in FIG. 4 could be adapted to be used in any embodiments of the present invention.

It is also apparent that the various forms of controlling means described above and further forms of controlling means not described could be used in the embodiments of the present invention at one or more of the pivots of one or more linkage arrangements. The controlling means may also have two or more ranges of operation in which different levels of control are applied. For example, the controlling means may have a first range of relative rotation over which no control or a low level of control is applied and a second range of relative rotation over which a higher level of control is applied.

It may also be advantageous to use an appropriate friction damper in any embodiment of the present invention such as damper 9 (see FIG. 2) or similar dampers as described in the Applicant's pending British Application GB 95 05750.1 which controls relative rotation of the flywheel masses.

As will be appreciated from the above, all the various embodiments of the invention in effect provide a torsional vibration damper for damping such vibrations in a vehicle driveline. If the invention is used solely as a torsional vibration damper the mass of the input and output flywheel masses 11 and 12 can be drastically reduced so that these components become in effect simple input and output members of the device which are, for example, of a relatively light pressed metal construction. The claims of this application should therefore be construed accordingly as covering such a torsional vibration damper with relatively light input and output members.

I claim:

1. A twin mass flywheel comprising:
   first and second co-axially arranged flywheel masses which are mounted for limited angular rotation relative to each other, the flywheel masses being interconnected by at least one linkage arragement, each linkage arangement having two or more circumferentially spaced main links pivotally mounted on one of the flywheel masses with each circumferentially adjacent pair of main links being interconnected via a generally circumferentially extending connecting linkage thereby forming a multi-link linkage, and an anchor link which pivotally connects the multi-link linkage with the other flywheel mass, relative rotation of the flywheel masses causing the multi-link linkage to be pivoted relative to said one flywheel mass by the anchor link, so that when the twin mass flywheel is rotating, relative rotation of the flywheel masses is resisted by centripetal forces acting to return the linkage arrangement to its centrifugally neutral position.

2. A twin mass flywheel as defined in claim 1 in which two or more linkage arrangements are disposed at circumferentially spaced locations around the twin mass flywheel.

3. A twin mass flywheel as defined in claim 1 in which the connecting linkage of each linkage arrangement consists of a single connecting link.

4. A twin mass flywheel as defined in claim 1 in which the connecting linkage of the linkage arrangement consists of part of a connecting link.

5. A twin mass flywheel as defined in claim 1 in which the connecting linkage of the linkage arrangement consists of a connecting link and a part of one or more other links.

6. A twin mass flywheel as defined in claim 1 in which the connecting linkage of the linkage arrangement consists of a connecting link and part of the anchor link.

7. A twin mass flywheel as defined in claim 1 in which the anchor link connects with a connecting link of the connecting linkage.

8. A twin mass flywheel as defined in claim 1 in which the anchor link connects with the connecting linkage.

9. A twin mass flywheel as defined in claim 1 in which the anchor link connects directly with one of the main links.

10. A twin mass flywheel as defined in claim 1 in which the anchor link connects with the pivotal connection of a connecting linkage and one of the main links.

11. A twin mass flywheel as defined in claim 1 in which, when positioned in a centrifugally neutral position, the angle subtended at the axis of rotation of the twin mass flywheel between the pivotal connection of adjacent main links with the one flywheel mass is the same as the angle subtended at the axis of rotation between the pivotal connections of the said adjacent main links with their corresponding connecting linkage.

12. A twin mass flywheel as defined in claim 1 in which, when positioned in a centrifugally neutral position, the angle subtended at the axis of rotation of the twin mass flywheel between the pivotal connection of adjacent main links with the one flywheel mass is not the same as the angle subtended at the axis of rotation between the pivotal connections of the said adjacent main links with their corresponding connecting linkage.

13. A twin mass flywheel as defined in claim 1 in which at least one main link or a connecting link of the connecting linkage, or anchor link is in the form of a pair of axially spaced plates.

14. A twin mass flywheel as defined in claim 1 in which at least one main link or a connecting link of the connecting linkage, or anchor link is a solid piece in the form of a bob weight.

15. A twin mass flywheel as defined in claim 1 in which associated with one or more links of the linkage arrangement there is controlling means for controlling the relative rotation of the flywheel masses.

16. A twin mass flywheel as defined in claim 1 in which each link of each linkage arrangement has at least two associated pivots and, associated with at least one pivot of at least one linkage arrangement, there is controlling means for controlling the relative rotation of the flywheel masses.

17. A twin mass flywheel as defined in claim 1 in which controlling means acts between the flywheel masses to control the relative rotation of the flywheel masses.

18. A twin mass flywheel as defined in claim 15 in which at least one controlling means is in the form of a metallic spring.

19. A twin mass flywheel as defined in claim 15 in which at least one controlling means is in the form of elastomeric material arranged to be loaded in compression or torsion.

20. A twin mass flywheel as defined in claim 15 in which at least one controlling means acts by friction.

21. A twin mass flywheel as defined in claim 15 in which the controlling means has a first range of relative rotation over which no control or a low level of control is applied and a second range of relative rotation over which a higher level of control is applied.

22. A twin mass flywheel as defined in claim 1 in which rotation of the flywheel masses in at least one direction is limited by abutments on one flywheel mass abutting abutments on the other flywheel mass.

* * * * *